(12) United States Patent
Decombe

(10) Patent No.: US 7,290,223 B2
(45) Date of Patent: *Oct. 30, 2007

(54) INTERFACE FOR DISPLAYING AND EXPLORING HIERARCHICAL INFORMATION

(75) Inventor: Jean Michel Decombe, Sausalito, CA (US)

(73) Assignee: Groxis, Inc., San Francisco, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 10/985,644

(22) Filed: Nov. 10, 2004

(65) Prior Publication Data

US 2005/0114786 A1    May 26, 2005

Related U.S. Application Data

(63) Continuation of application No. 09/859,343, filed on May 16, 2001, now Pat. No. 6,879,332.

(51) Int. Cl.
*G06F 13/00*    (2006.01)
*G06F 15/00*    (2006.01)

(52) U.S. Cl. ...................................... 715/853; 715/810

(58) Field of Classification Search ................ 715/764, 715/848, 781, 808, 810, 853, 763
See application file for complete search history.

(56) References Cited

U.S. PATENT DOCUMENTS

| | | | |
|---|---|---|---|
| 5,341,466 A | 8/1994 | Perlin et al. | |
| 5,495,473 A | 2/1996 | Cox | |
| 5,495,479 A | 2/1996 | Galaand et al. | |
| 5,528,735 A | 6/1996 | Strasnick et al. | |
| 5,606,654 A | 2/1997 | Schuur | |
| 5,615,325 A | 3/1997 | Peden | |
| 5,844,559 A | 12/1998 | Guha | |
| 5,845,270 A | 12/1998 | Schatz et al. | |
| 5,924,090 A | 7/1999 | Krellenstein | |
| 6,037,944 A | 3/2000 | Hugh | |
| 6,104,400 A | 8/2000 | Halachmi et al. | |
| 6,111,578 A | 8/2000 | Tesler | |
| 6,166,736 A | 12/2000 | Hugh | |
| 6,166,739 A | 12/2000 | Hugh | |
| D439,584 S | 3/2001 | Wang et al. | |
| 6,237,006 B1 | 5/2001 | Weinberg et al. | |
| D443,623 S | 6/2001 | Niijima | |

(Continued)

FOREIGN PATENT DOCUMENTS

WO    WO-0013104    3/2000

(Continued)

OTHER PUBLICATIONS

Final Office Action from U.S. Appl. No. 11/085,829, mailed Mar. 21, 2007.

(Continued)

*Primary Examiner*—Cao (Kevin) Nguyen
(74) *Attorney, Agent, or Firm*—Blakely, Sokoloff, Taylor & Zafman

(57) ABSTRACT

A user interface is animated and configurable to optimize, facilitate and simplify displaying on a display device and exploring via user input a hierarchy of information accessible by an electronic device.

38 Claims, 3 Drawing Sheets

THE CURRENT FOCUS IS THE LARGE MAGENTA NODE, BUT THIS WILL CHANGE AS THIS NODE WAS JUST CLICKED

THE NODE IS PROGRESSIVELY BECOMING THE FOCUS, AS IT IS CENTERED IN THE VIEW AND GETS LARGER

MORE NODES BECOME VISIBLE INSIDE THE NEW FOCUS AND OTHER NODES, AS THEY GET LARGE ENOUGH

U.S. PATENT DOCUMENTS

| | | | |
|---|---|---|---|
| 6,256,032 | B1 | 7/2001 | Hugh |
| 6,285,367 | B1 | 9/2001 | Abrams et al. |
| 6,348,927 | B1 | 2/2002 | Lipkin |
| 6,363,377 | B1 | 3/2002 | Kravets et al. |
| 6,373,484 | B1 | 4/2002 | Orell et al. |
| 6,377,287 | B1 | 4/2002 | Hao et al. |
| 6,393,159 | B1 | 5/2002 | Prasad et al. |
| 6,404,446 | B1 | 6/2002 | Bates et al. |
| 6,434,556 | B1 | 8/2002 | Levin et al. |
| D463,444 | S | 9/2002 | Istvan et al. |
| D464,360 | S | 10/2002 | Grundel et al. |
| 6,460,025 | B1 * | 10/2002 | Fohn et al. ................... 706/45 |
| 6,496,842 | B1 * | 12/2002 | Lyness ........................ 715/514 |
| D468,748 | S | 1/2003 | Inagaki |
| D474,195 | S | 5/2003 | Kates et al. |
| D474,197 | S | 5/2003 | Nguyen |
| D474,778 | S | 5/2003 | Barnes |
| D478,912 | S | 8/2003 | Johnson |
| 6,604,108 | B1 | 8/2003 | Nitahara |
| 6,628,304 | B2 * | 9/2003 | Mitchell et al. ............ 715/734 |
| 6,775,659 | B2 | 8/2004 | Clifton-Bligh |
| 6,990,238 | B1 | 1/2006 | Saffer et al. |
| 7,042,846 | B2 | 5/2006 | Bauer |
| 2001/0034733 | A1 | 10/2001 | Prompt et al. |

FOREIGN PATENT DOCUMENTS

| | | |
|---|---|---|
| WO | WO-0115011 | 3/2001 |

OTHER PUBLICATIONS

PCT Search Report from PCT/US02/15462, mailed Aug. 20, 2002, 7 pgs.

Bederson, et al., "A Zooming Web Browser", SPIE Multimedia Computing and Networking, vol. 2667, pp. 260-271, 1996, San Jose, CA, (1996),260-271.

Bederson, et al., "A Zooming Web Browser, To Appear in Human Factors in Web Development", Eds. Ratner, Grose, and Forsythe, http://www.cs.umd.edu/hcil/pad++/papers/bookchap-98-web-browser/index.html, pp. 1-12, Printed Mar. 17, 2004, (1998),1-12.

Bederson, et al., "Advances in Pad++ Zoomable Graphics Widget", Bederson, USENIX Tcl/Tkm'95 Workshop, 1995, Toronto, CA, (1995).

Bederson, et al., "Implementing A Zooming User Interface", Experiencing Building Pad++, Software: Practice and Experience, vol. 28, No. 10, Aug. 1998, West Sussex, England, (1998), vol. 28, No. 10.

Bederson, et al., "Pad++ A Zoomable Graphical Interface", ACM SIGCHI '94, 1994, Boston, MA, (1994).

Bederson, et al., "Pad++: A Zoomable Graphical Sketchpad for Exploring Alternate Interface Physics", Journal of Visual Languages and Computing, vol. 7, 1996, UK, (1996), vol. 7.

Bederson, et al., "Pad++: A Zooming Graphical Interface For Exploring Alternate Interface Physics", Symposium on User Interface Software and Technology, 1994, Marina del Ray, CA, (1994).

Bederson, et al., "Space-Scale Diagrams: Understanding Multiscale Interfaces", CM SIGHI, 1995, Denver CO, (1995).

Hightower, et al., "Graphical Multiscale Web Histories, A Study of PadPrints", ACM Conference on Hypertext, Jun. 20, 1998, Pittsburg, PA, (1998).

Perlin, et al., "An Alternative Approach to the Computer Interface", ACM SIGGRAPH, 1993, Anaheim, CA, (1993).

* cited by examiner

INTERFACE FOR DISPLAYING AND EXPLORING HIERARCHICAL INFORMATION

This application is a continuation of application Ser. No. 09/859,343 titled "User Interface For Displaying and Exploring Hierarchical Information", filed May 16, 2001 now U.S. Pat. No. 6,879,332.

FIELD OF THE INVENTION

The present invention relates to a user interface optimized to display and explore hierarchical information via a display device for an electronic device such as a computer, personal digital assistant, television, cellular telephone, etc.

BACKGROUND OF THE INVENTION

A user interface in accordance with the present invention is easier to use than prior art user interfaces designed to serve the same purpose, primarily due to click focusing and node aggregation mechanisms. Parameters can be adjusted to display only a few nodes, in order to facilitate exploration, or thousands of nodes simultaneously, in order to facilitate an individual's understanding of the entire hierarchy of information.

BRIEF DESCRIPTION OF THE DRAWINGS

The present invention is illustrated by way of example, and not necessarily by way of limitation in the figures of the accompanying drawings in which like reference numerals refer to similar elements.

DETAILED DESCRIPTION OF THE INVENTION

Figure 1:
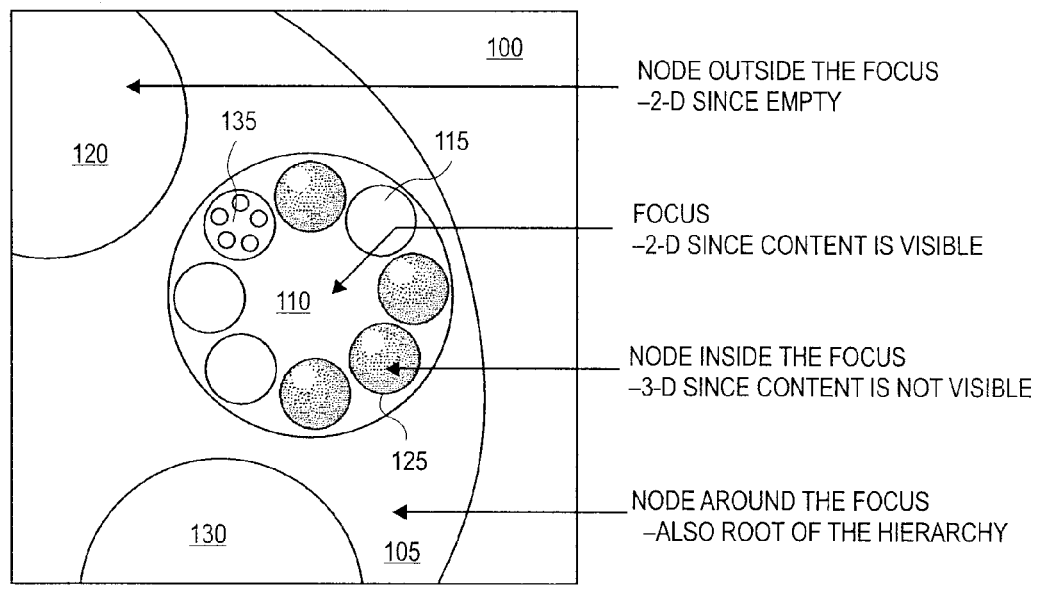
FIG. 1 illustrates various elements of a display in accordance with one embodiment of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data within a memory of an electronic device such as a computer. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical, optical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the following discussion throughout the description, discussions using terms such as "processing" or "computing" or "calculating" or "determining" or "displaying" or the like, refer to the action and processes of a computer system, or other electronic device, that manipulates and transforms data represented as physical (electronic) quantities within the device's registers and memories into other data similarly represented as physical quantities within the memories or registers or other such information storage, transmission or display devices.

The invention also relates to apparatus for performing the operations herein. These apparatus may be specially constructed for the required purposes, or may comprise a general-purpose computing or electronic device selectively activated or reconfigured by a program stored in the device. Such a program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices; electrical, optical, acoustical or other form of propagated signals (e.g., carrier waves, infrared signals, digital signals, etc.); etc. or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A user interface in accordance with the present invention can be used to explore any kind of hierarchy of information, for example, directories, query result sets (from databases engines, search engines, etc.), file stores, etc. Furthermore, the user interface contemplated by the present invention can be used on or in conjunction with any platform that has a pointing device (e.g., mouse, trackball, stylus, directional pad, remote control, etc.), including personal computers, Internet appliances, personal digital assistants, telephones, mobile or cellular telephones, television sets, etc. It is also contemplated that the user interface can be controlled through speech, eye movement, and other modalities.

With reference to FIG. 1, access to a hierarchy of information 100 is provided by way of nodes of information, or simply, nodes. The top node in the hierarchy of nodes is the root node 105 of the hierarchy. The root node 105 encompasses an inside, or subhierarchical, node that is the node of interest or focus for an individual viewing and accessing the hierarchy of information 100. Thus, the current node of interest being explored by a user in the hierarchy of information is called the focus node 110, or simply, focus 110.

The focus 110 can and is expected to change as the user explores the hierarchy. Generally, the root node 105 initially is the focus 110.

The hierarchy of information 100 is displayed within a viewing region, or view, of a given size, known as the view size. Often times, the view size is, at least in part, a function of the viewable area of a display device, and may also be affected by the size of a window displayed on the display device in which window the hierarchy of information is displayed. The focus 110, in one embodiment, essentially is centered in the viewing region, and occupies a certain percentage of the view size, known as the focus-to-view size ratio, or more simply, focus-to-view ratio.

All other nodes displayed in the viewing region are displayed inside the focus, if the focus contains the nodes, e.g., nodes 115 and 125, outside the focus, if the nodes share a common, possibly recursive container with the focus, e.g., nodes 120 and 130, or around the focus (if the nodes contain the focus). In the example illustrated in FIG. 1, the root node 105 happens to be around the focus node 110.

To be displayed, nodes need to intersect with the viewing region and be larger than a certain size, known as the minimum node size. If a node that is displayed in the view contains other nodes that are too small to be displayed, that is, nodes of a size less than the minimum node size, the node is displayed in a shape that suggests to the viewer that the displayed node contains a subset of the hierarchical information that is currently hidden (this is referred to herein as a node aggregation mechanism). For example, a displayed node containing hidden hierarchical information may take the shape of a convex, three-dimensional node (e.g., spherical node 125, inside the focus node, is spherical or three-dimensional in shape, indicating further content, presently not visible, is inside the node).

In contrast, if a displayed node contains some nodes that are too small to be displayed and some other nodes that are all large enough to be displayed, the displayed node may have a different, three-dimensional appearance (e.g., a reversed conical shape, like an inverted funnel) to suggest to the viewer that more nodes will be revealed if either the view size, the focus-to-view ratio, or the minimum node size is adjusted appropriately. (It is appreciated that these parameters may be automatically, indirectly or manually adjusted).

If a node contains nodes that are all large enough to be displayed (that is, the nodes are of a size greater than the minimum node size), or if the node is empty, the node takes on yet another appearance. For example, node 115 appears empty, and has a flat, two-dimensional appearance, indicating the node is a leaf node, and no further subhierarchical information may be obtained via this node. Node 135 contains nodes large enough to be displayed, and is also flat, two-dimensional, indicating all nodes accessible via node 135 are large enough to be displayed.

Thus, in one embodiment of the invention, an aggregation mechanism is characterized by three cues (e.g., convexity, concavity, and flatness) that indicate three levels of sub-hierarchy visibility (none, partial, and total visibility).

It is appreciated that while the embodiment illustrated in FIG. 1 utilizes convex, concave, and flat nodes to depict or suggest the absence or presence of additional information in the hierarchy, other shapes, colors or symbols may be utilized to convey this information, so long as the viewer is able to discern between the different kinds of nodes. Moreover, while a node having a certain shape conveys to the viewer certain information, e.g., a convex shaped node may convey to the viewer whether further nodes that are too small to be displayed are accessible via the convex shaped node, other two- or three-dimensional characteristics may be interchanged to convey that same information without departing from the present invention.

In FIG. 1, nodes are disc-shaped and laid out in a circular fashion within a containing node. The user interface nonetheless works similarly with other, perhaps random, shapes and layouts. For example, the hierarchy illustrated in FIG. 1 could represent the map of a city, its buildings, their rooms, etc. Also, the user interface can be three-dimensional, in which case aggregate nodes are displayed as opaque, and all other nodes are displayed as translucent.

The user can select, for example, by clicking with a computer mouse, any visible node to make it the new focus node while preserving the spatial arrangement of nodes. In so doing, the focus is centered in response to the user selection. Thus, clicking on a node around the focus shrinks the visible space, clicking on a node outside the focus migrates, or translates, the visible space (also shrinking or enlarging the visible space as necessary), and clicking on a node inside the focus enlarges the visible space. If the selected node is already the focus, a special flag, known as the focus bouncing flag, decides whether nothing happens or whether the node that contains the focus, that is, the node around the focus node, becomes, in turn, the focus node.

This method is advantageous in that only a single action is required on the part of the user or viewer to change the focus—clicking on a node other than the focus node. In addition, focus bouncing eases exploring the hierarchically related nodes on smaller displays, such as a cellular telephone display screen.

In one embodiment of the invention, the visible space essentially is a flat surface that can be stretched around the center of the focus to display more or less detail regarding the focus. This surface is seen from above through the view, by default, but it can also be seen from a projected perspective, as if in three dimensions. In the case of the projected perspective, the view can be rotated by adjusting the direction of view relative to the focus, known as the view angle.

In accordance with the present invention, the size of the explored hierarchy of information is not a concern to the viewer or the implementor (that is, someone who implements the technology on a given platform using a given programming language) because rendering is contextual, i.e., the display is centered around the focus node. In stretching the visible space, there is no notion of absolute scale or position, because each node has a relative, polar position within its container node. First, the focus size is computed based on the focus-to-view ratio. Second, the smallest possible container that encloses the view is searched recursively starting from the focus. Third, this container is rendered, then its entire sub-hierarchy is rendered recursively, while branches of this sub-hierarchy where nodes do not intersect the view or are not large enough to be displayed are discarded. Thus, the amount of computation required to render the view is minimized, even at very deep levels of the displayed hierarchy, which depth can, in fact, be almost limitless. Moreover, rendering speed essentially is independent of the size of the displayed hierarchy.

It should be noted that a maximum leaf size, expressed in pixels, may be associated with any leaf node. In order to ensure that maximum leaf sizes are not exceeded unnecessarily, the focus node will sometimes not reach the size computed based on the focus-to-view ratio. Instead, the focus node might only reach a smaller (but never larger) size if all nodes in its sub-hierarchy have already reached their respective maximum leaf sizes. A default maximum leaf size is associated to all nodes that do not have a specific maximum leaf size.

Figure 2A:
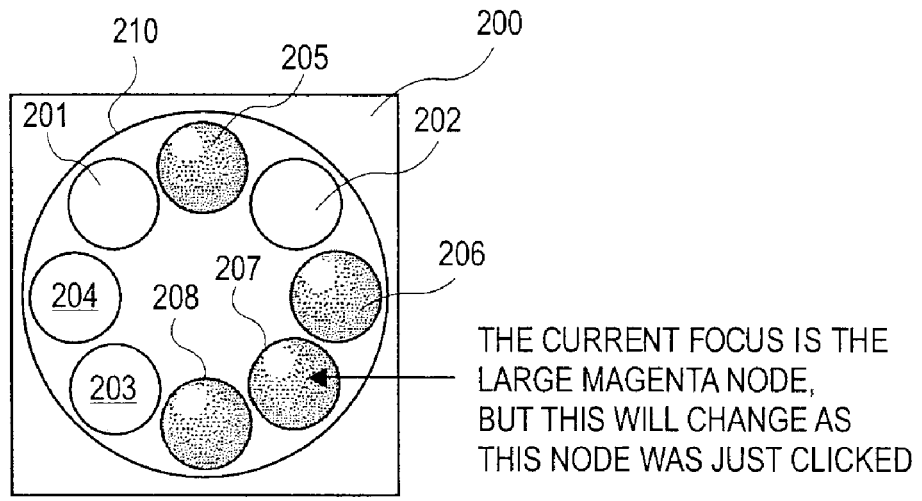
FIGS. 2(a), 2(b) and 2(c) illustrate a partial transition from one focus to the next focus in accordance with one embodiment of the present invention.
Figure 2B:
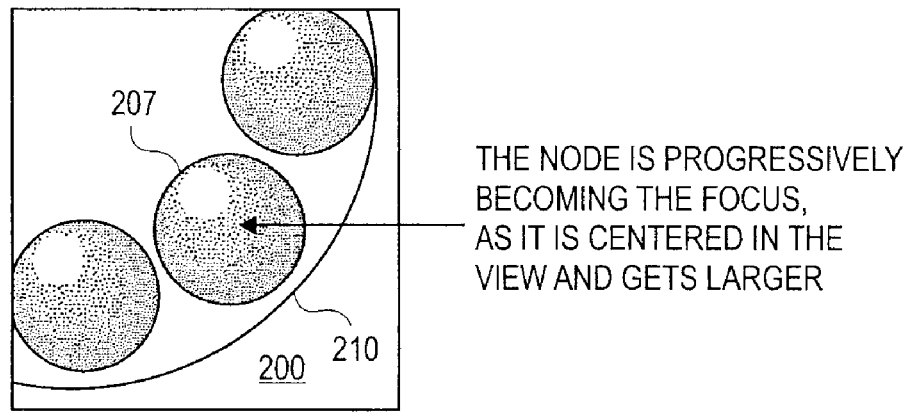
Figure 2C:
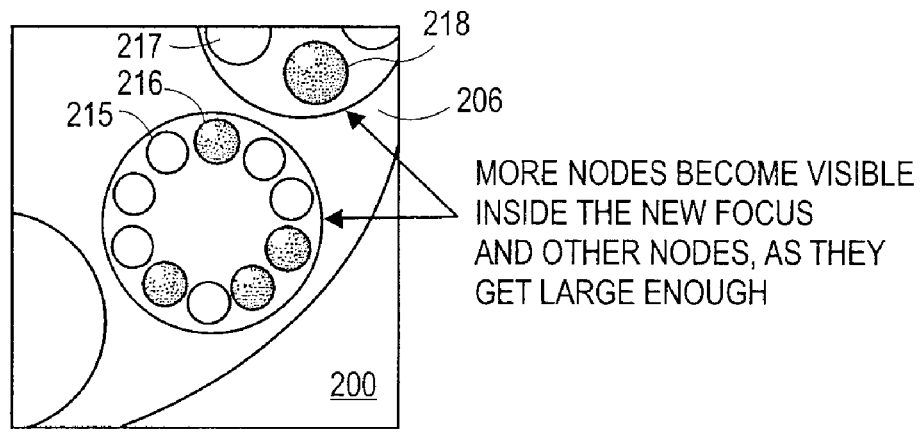

FIG. 2 illustrates a partial, transition from one focus node to another focus node. Although the present invention contemplates animating the transition from one focus node to another, the FIG. 2 provides only three snap shots of the animated transition. Each of FIGS. 2(*a*), 2(*b*) and 2(*c*) illustrate a viewing region, or view, 200, upon a display screen. In FIG. 2(*a*), those nodes larger than the minimum node size are displayed. For example, root node 210, the focus node, is displayed and centered about viewing region 200. Further nodes 201-208 are displayed. Nodes 201 through 204 are flat, two-dimensional nodes, indicating, in one embodiment of the invention, that the nodes are empty, indicating such nodes are leaf nodes. Nodes 205-208, on the other hand, are convex, spherical shaped nodes, indicating such nodes contain yet further nodes containing a subset of hierarchical information.

The transition from one focus node to the next, i.e., from a source node to a destination node, is animated, in one embodiment of the invention, to avoid disorienting the user, through a given number of animation frames, known as the animation frame count. The transition may be linear to avoid inducing in the user any feeling of motion sickness during lengthy exploration sessions. The speed of the transition, known as the animation speed factor, is constant by default but can be adjusted so as to speed up or slow down the transition. For example, a user may select node 207 in FIG. 2(*a*), by clicking on the node using an input device such as a mouse. The node 207 begins to expand and migrate toward the center of the viewing region. FIG. 2(*b*) shows an intermediate step in the animated migration and expansion of node 207. Note that node 207 is progressively becoming the focus, as it is centered in the view and gets larger.

(The term "source node", as used herein, refers to the source focus node, that is, the present focus node, or simply, focus node. The term "destination node" as used herein, refers to the destination focus node, that is, the node that the user has selected and that is to become the focus, once the transition from the present focus to the selected node is completed).

Eventually, node 207 is centered and the visible space provided for the node increased, as shown in FIG. 2(*c*), relative to the size of the node as originally viewed in FIG. 2(*a*). The node size of node 207 increased in the transition, and the nodes contained within node 207, e.g., nodes 215 and 216, are now larger than the minimum node size and are, thus, displayed as well. Optionally, nodes contained in nodes other than the focus node, and that are larger than the minimum node size, are also displayed. For example, nodes 217 and 218 are visible in node 206.

It should be noted that when the distance between the source node and destination node is so large that the animation would not fill its cognitive role (because no two successive animation frames ever intersect), the transition may become, in one embodiment of the present invention, a combination of translating and morphing to suggest or infer the direction and length of the vector from destination node's position to the source node's position (i.e., the center of the view).

In this manner, the destination node's position and size are first computed relative to the focus node. Then, a vector from the destination node's position to the source node's position is computed. If the vector is too long, that is, if the vector divided by the animation frame count still exceeds the size of the view, a morphing animation is used to symbolize the long translation. Otherwise, the vector is broken down into a discrete amount of steps. Then, the destination node's position and size is progressively adjusted to reach those of the focus node.

To reiterate, the vector is too long if, after having divided it by the number of transition frames, also known as the animation frame count, the resulting, smaller vector still exceeds the dimensions of the view. In other words, if one were to draw each animation frame thusly obtained next to one another, one would notice that no two successive frames have any pixel in common, because they do not intersect—if the frames were displayed in succession to animate the transition, the user would not detect motion. The user would merely see the screen display jumping from one frame to a totally different next frame, and so on.

Adjusting the user interface parameters referred to above is optional, and not necessary for proper operation of the present invention. The controls may be desirable on a personal computer, while they may unnecessarily clutter the display on a personal digital assistant, or make the user interface harder to use on a television set. In these cases, default values may be preset.

Figure 3A:
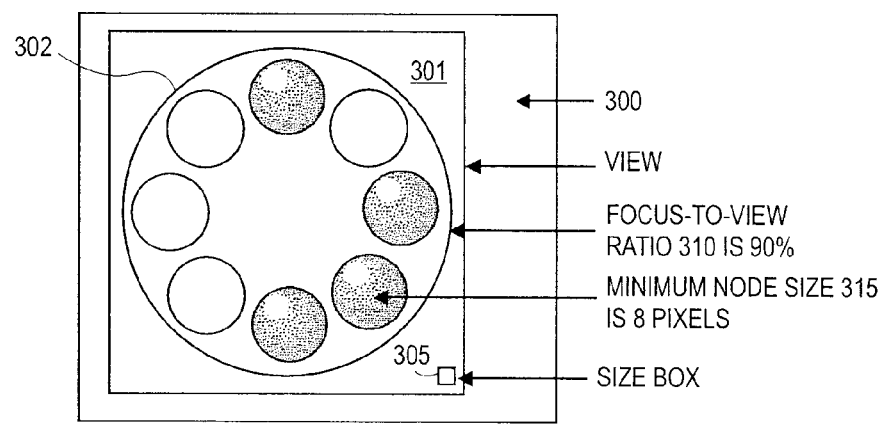
FIGS. 3(a) and 3(b) illustrate an adjustment of user interface parameters through controls, in accordance with one embodiment of the present invention.
Figure 3B:
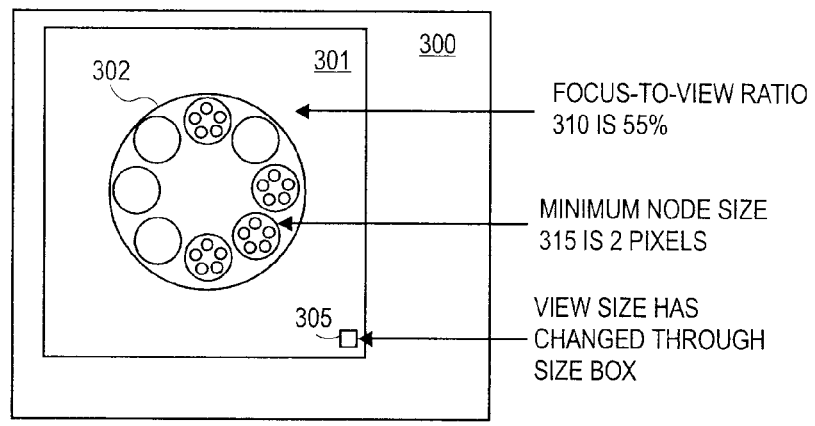

With reference to FIG. 3, various such parameters are now discussed. A display screen 300 is shown. Within display screen 300 is a viewing region, or view, 301. The viewing region in FIG. 3(*a*) provides for a larger viewing area, while the view in FIG. 3(*b*) is relatively smaller. The view size may be expressed, for example, as a pair of pixel values, and can be adjusted using, for example, a size box. A focus node 302 is displayed in the viewing region. The focus-to-view ratio 310 may be expressed as a percentage, and can be adjusted, for example, using a linear slider (not shown). The slider may be displayed by selecting to adjust this parameter via a pull down menu, or may be incorporated in the display screen, for example, adjacent the viewing region. In FIG. 3(*a*), the focus-to-view ratio is 90%, whereas in FIG. 3(*b*), the focus-to-view ratio is 55%.

The minimum node size 315 may be expressed as a pixel value, and can also be adjusted, for example, using a linear slider (not shown). For example, FIGS. 3(*a*) and 3(*b*) illustrate minimum node sizes of 8 pixels and 2 pixels respectively. Thus, further granularity in the display is provided in FIG. 3(*b*) versus FIG. 3(*a*). That is, additional levels of nodes within the hierarchy of information accessed via focus node 302 are displayed in FIG. 3(*b*) versus FIG. 3(*a*).

The focus bouncing flag (not shown), discussed above, is expressed as a Boolean value and can be adjusted, for example, using a check box. The view angle, referred to earlier, may be expressed as an angle and can be adjusted, for example, using a circular slider (not shown). The default maximum leaf size may be expressed as a pixel value and can be adjusted, for example, using a linear slider (not shown). The animation frame count may be expressed as an integer and can be, for example, automatically configured based on system memory, processor speed, etc. The animation speed factor may be expressed as a real number and can be adjusted, for example, using a linear slider (not shown).

The invention claimed is:

1. A user interface comprising:
   a plurality of nodes organized into a hierarchy of information wherein at least one node is a focus node and wherein nodes contained inside the focus node form a first sub-hierarchy of nodes in a view;
   an aggregator mechanism to associate a visual cue with a node in the view, the visual cue to indicate the node comprises a second sub-hierarchy having hidden nodes, wherein the hidden nodes are too small to be displayed in the view; and a display to render the plurality of nodes and the visual cue in the view.

2. The user interface of claim 1, wherein the visual cue to further indicate the second sub-hierarchy is completely hidden.

3. The user interface of claim 2, wherein the visual cue comprises a convex shape.

4. The user interface of claim 2, wherein the node comprises other nodes, all of which are too small to be displayed.

5. The user interface of claim 1, wherein the visual cue to further indicate the second sub-hierarchy is partially hidden.

6. The user interface of claim 5, wherein the cue is concave shape.

7. The user interface of claim 5, wherein the node in the view associated with the visual cue contains other nodes, some of which are too small to be displayed.

8. The user interface of claim 1, further comprising a second visual cue to indicate a second node contains only visible nodes.

9. The user interface of claim 8, wherein the second visual cue has a flat shape.

10. The user interface of claim 8, further comprising a third visual cue to indicate a third node contains no hidden sub-hierarchy and is also empty and a leaf node.

11. The user interface of claim 1, further comprising a second visual cue to indicate a second node comprises visible nodes and hidden nodes.

12. The user interface of claim 1, wherein the visual cue comprises a color or symbol.

13. The user interface of claim 1 wherein a node shape, color, or symbol, or combination to depict the absence or presence of additional information in the hierarchy of information.

14. The user interface of claim 1, further comprising an adjustable view angle to affect a perceived viewing perspective in three dimensional space.

15. The user interface of claim 1, further comprising at least one adjustable parameter to facilitate exploration, wherein the adjustable parameter to affect the quantity of nodes displayed or the style of visual cues applied by the aggregator mechanism, or both.

16. The user interface of claim 15, wherein the user interface to accept an input to adjust the adjustable parameter.

17. The user interface of claim 15, wherein the adjustable parameter is selected from the group consisting of view size, minimum node size, focus-to-view ratio and default maximum leaf size.

18. The user interface of claim 17, wherein focus-to-view ratio is the selected adjustment and is provided via a slider incorporated on a display screen.

19. The user interface of claim 15, wherein changes to the selected parameter to result in a change of a specified node's visual cue.

20. The user interface of claim 19, wherein a change in the selected adjustable parameter results in at least one node having a visual cue changes, and wherein the visual cue changes to a shape selected from the group consisting of convex, concave and flat.

21. A user interface comprising:
a plurality of nodes organized into a hierarchy of information wherein at least one node is a focus node and wherein nodes contained inside the focus node form a sub-hierarchy of nodes in a view;
an aggregator means to associate at least one visual cue to a node in the view, the visual cue to indicate the node comprises a second sub-hierarchy of hidden nodes, wherein the hidden nodes are too small to be displayed in the view;
a display to render the nodes in the view according to their associated visual cue; and
interface controls to accept input, wherein the user interface system to change focus to a destination focus node in the hierarchy based on the input.

22. The user interface of claim 21, wherein the input originates at a pointing device.

23. The user interface of claim 22, wherein the input describes a click event on a node around the focus node, wherein the user interface to shrink the visible space based on the input.

24. The user interface of claim 22, wherein the input describes a user click event at a node outside the focus node, and wherein the user interface to migrate or translate the visible space based on the input.

25. The user interface of claim 22, wherein the input describes a user click event at a node inside the focus node, and wherein the user interface to enlarge the visible space associated with the node based on the input.

26. The user interface of claim 22, wherein a transition is shown in the view to animate the change of the focus node to the destination focus node based on the input.

27. The user interface of claim 26, wherein the destination focus node is substantially centered in the view after the transition is shown in the view to animate the change of the focus node to the destination focus node.

28. The user interface of claim 27, wherein the user interface also having an adjustment for animation speed factor.

29. The user interface of claim 27, wherein the transition to animate the change of the focus node to the destination focus node is a linear straight-line transition.

30. The user interface of claim 27, wherein the transition to animate the change of the focus node to the destination focus node is non-linear transition having a non-linear speed.

31. The user interface of claim 27, wherein the transition to animate the change of the focus node to the destination focus node is combination of translating and morphing.

32. The user interface of claim 31, wherein the transition to indicate the direction and length of a vector from the newly selected destination focus node to the focus node.

33. The user interface of claim 27, wherein the user interface to further include an animation frame count that sets number of frames to use in the transition.

34. The user interface of claim 33, wherein the animation frame count is automatically configured based on system memory, processor speed.

35. The user interface of claim 33, wherein the destination focus node's position and size are computed relative to the focus node and a vector from the destination focus node's position to the focus node position is computed and divided by the animation frame count to determine whether or not it exceeds the size of the view.

36. The user interface of claim 35, wherein the divided value is greater than the size of the view and a morphing animation is used to symbolize the long transition.

37. The user interface of claim 35, wherein the divided value is less than the size of the view and the vector is broken down into a discrete amount of steps of which the destination focus node's position and size is progressively adjusted to reach those of the focus node.

38. A user interface system comprising:
means for organizing a plurality of nodes into a hierarchy of information wherein at least one node is a focus and the nodes contained inside the focus form a sub-hierarchy of nodes in a view;
an aggregator means to apply at least one visual cue with a node in the view, the visual cue to indicate the node comprises a second sub-hierarchy of hidden nodes, wherein the hidden nodes are too small to be displayed in the view;
a display to render the nodes in the view according to the visual cue applied by the aggregator mechanism; and
at least one adjustable parameter to affect a change to the number of nodes displayed or the visual cues applied by the aggregator mechanism; wherein the user interface system to allow a destination node in the hierarchy to become the focus, based on input from the user interface system.

* * * * *